United States Patent [19]
Ehrlich

[11] Patent Number: 4,703,948
[45] Date of Patent: Nov. 3, 1987

[54] TRAILER FLOOR ASSEMBLY
[75] Inventor: Donald J. Ehrlich, Lafayette, Ind.
[73] Assignee: Wabash National Corporation, Lafayette, Ind.
[21] Appl. No.: 813,565
[22] Filed: Dec. 26, 1985
[51] Int. Cl.⁴ ..................... B62D 27/00; H01R 33/00; H01B 7/00
[52] U.S. Cl. .................................. 280/782; 105/422; 180/89.1; 296/208
[58] Field of Search ............... 180/89.1; 296/1 F, 208; 105/422, 370, 371, 372, 375; 280/782

[56] References Cited
U.S. PATENT DOCUMENTS

| | | | |
|---|---|---|---|
| 2,112,101 | 3/1938 | Kliesrath | 280/782 |
| 3,333,552 | 8/1967 | Reynolds et al. | 105/422 |
| 3,494,657 | 2/1970 | Tantlinger et al. | 105/422 |
| 3,681,883 | 8/1972 | Ehrlich | 52/220 |
| 3,692,349 | 9/1972 | Ehrlich | 296/28 |

Primary Examiner—Richard A. Bertsch
Attorney, Agent, or Firm—Trexler, Bushnell, Giangiorgi & Blackstone, Ltd.

[57] ABSTRACT

A floor assembly for use in a trailer or other such vehicle which utilizes flexible conductors, said assembly comprises a floor section including a plurality of interfitting floor boards and elongated housing means. The housing means define a downwardly facing open channel for receiving said conductors. The housing means includes wall means in said channel defining a sub-channel having an opening of predetermined width for receiving and retaining at least one of said conductors.

12 Claims, 2 Drawing Figures

TRAILER FLOOR ASSEMBLY

BACKGROUND OF THE INVENTION

The present invention relates generally to a novel trailer body and more specifically to a novel floor construction used with trailer bodies or other channeled vehicular structures.

Trailers and the like, of the general type disclosed herein are well known and include a plurality of flexible conductors such as cables or air hoses and the like which extend from the back end of the trailer to the front end thereof, where they are connected to the appropriate components of a truck or other such towing vehicle. Generally, the conductors are positioned below the trailer's flooring. In the past the prior art disclosed, the use of substantially rectangular channeled housing formed with the trailer's flooring for receiving various conductors. However, this has been found to be unsatisfactory since it requires special, very expensive flooring material. It has also proved unsatisfactory since the various connectors are loose in the channeled housing and are easily damaged.

More recently, the prior art has disclosed the utilization of substantially U-shaped channeled housing located centrally within the trailer's flooring for receiving various connectors. This housing can be used with standard shiplap boards. However, this, too has been found to be unsatisfactory since the connectors are loose in the channeled housing and are easily damaged. Furthermore, spliced branch lines, such for example as wires to center marker lights must be located below the floor so that the splice and branch lines are exposed to the elements.

Accordingly, a general object of the present invention is to provide a new and improved floor assembly, for use in a trailer or other such vehicle which assembly is simple in design and economical to manufacture.

A more particular object of the present invention is to provide a novel floor construction having a novel housing into which elongated flexible conductors may be readily inserted and constructed to hold them in a fixed position to minimize the possiblity of damage thereto.

Another object of the present invention is to provide a channeled housing of the above stated type which provides easy access to the aforesaid cables, whereby to facilitate maintenance thereof.

Still another object is to provide a novel floor construction as described above in which wire, hoses or other connectors may be disposed along one or both sides of a trailer in a protected manner whereby to eliminate any need for exposed spliced branch lines beneath the trailer floor.

These and other objects and features of the present invention will become more apparent upon consideration of the following descriptions.

BRIEF DESCRIPTION OF THE DRAWINGS

The features of the present invention which are believed to be novel are set forth with particularlity in the appended claims. The organization and manner of operation of the invention, together with further objects and advantages thereof, may best be understood by reference to the following description taken in connection with the accompanying drawings in which:

DETAILED DESCRIPTION OF THE ILLUSTRATED EMBODIMENT

Figure 1:
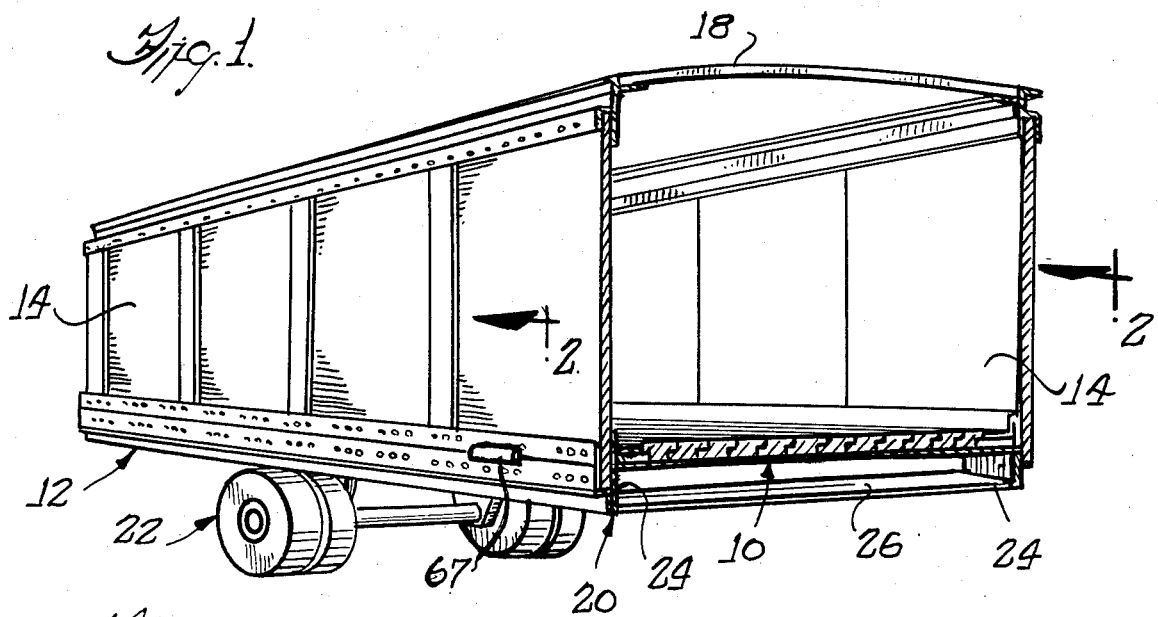
FIG. 1 is a perspective view showing a trailer body structure incorporating features of the present invention.

Turning to the drawings, wherein the components are designated by like reference numerals throughout the various figures, a floor assembly 10, constructed in accordance with the present invention, is provided with a trailer body or other vehicular structure 12, which is illustrated in FIG. 1. The trailer body also includes a pair of rectangular side walls 14 a front and rear door (not shown) and a roof 18. The trailer body 12 and floor assembly 10 are secured by suitable means on top of a rectangular frame assembly 20, which in turn is suitably attached to a wheel assembly 22.

Figure 2:
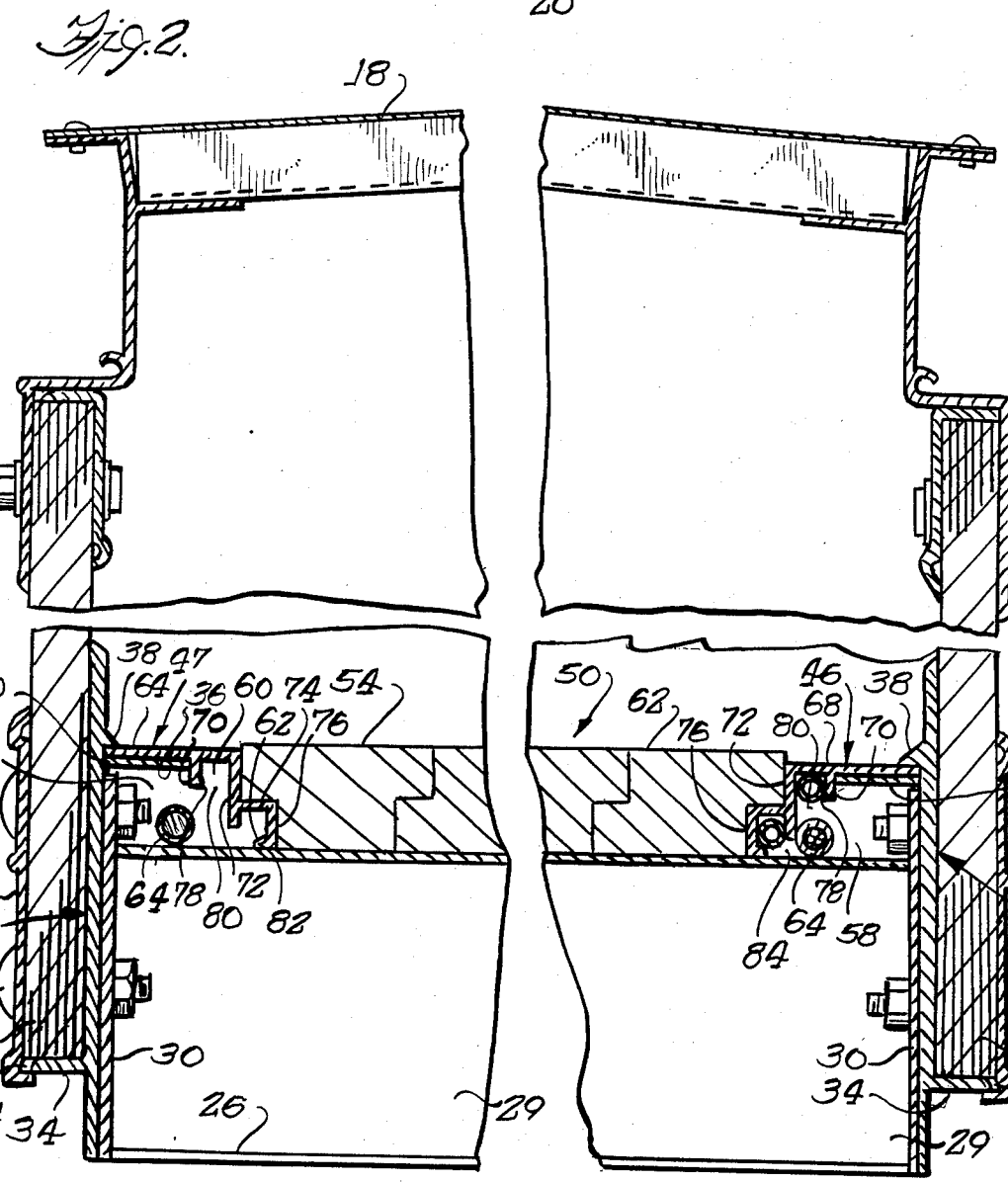
FIG. 2 is a fragmentary sectional view of a trailer body taken along line 2—2 of FIG. 1.

As best shown in FIG. 2, the rectangular frame assembly comprises a pair of longitudinally extending and laterally spaced apart side rails 24 which are suitably joined at their common opposite ends by transverse end members 26 for thereby defining a substantially rectangular frame. A plurality of transversely extending I-beams or similar beams spaced longitudinally of the frame are welded or otherwise suitably joined at their opposite ends to end plates 30 which in turn are bolted to the two side rails 24. The frame defines longitudinally spaced openings 29 between the I-beams. The side rails 24, present a pair of outwardly laterally extending ledges 34 at opposite sides of the trailer body. Each side rail further includes an inwardly laterally extending ledge or flange 36, and an inwardly extending lip 38 defining a notch or groove 40. Lower clamping rails 42 are disposed along lower edges of the side walls 14 and each rail 42 is secured to the adjacent side wall 14, side rail 24 and end plate 30 by bolts 43 or other suitable fastening means. Preferably, clamping rails 42 and the ledges 34 define gaps 44 to provide a vent for any moisture that may enter the junctions between the parts.

In accordance with the present invention floor assembly 10 which is illustrated best in FIG. 2, comprises two identical but mirror image elongated housing channels 46 and 47 respectively. The middle floor section 48 comprises shiplap floor boards 50 and a T-shaped floor board 54. The shiplap floor boards 50 include rabbets 56 which are cut in opposite margins so that the edges of each board lap over the edges of adjacent boards. The T-shaped floor board is adapted to interfit with an adjacent board 50 and with one of the channel members 46 or 47 as described below.

The channeled housings 46 and 47 are defined by an elongated inverted channel 58 and two substantially elongated inverted U-shaped sub-channels, 60 and 62 respectively, for receiving various types of flexible conductors such as electrical cables 64, air hoses 66 or the like. The conductors may be inserted into either or both of the channeled housings 46 and 47 from either or both ends thereof and thus may be directed to lights 67 or the like at the ends and/or the sides of the trailer without being expanded to the elements beneath the trailer floor.

The housing includes an upper rectangular elongated top plate or section 68, a leg portion 70, which extends from a mid portion of the upper top plate 68 downwardly into channel 58 and forming a side wall for sub-channel 60. Another leg portion 72 extends downwardly from an edge of the upper top plate 68 for forming a side wall of sub-channels 60 and 62. A lower elongated top plate or section 74 provides the top of sub-channel 62, extends outwardly from leg portion 72 and terminates in leg portion 76 which extends downwardly forming a side wall for sub-channel 62.

Leg portion 70, curves inwardly to form a lip 78. The lip 78 extends inwardly to define an opening 80 which has a width less than the width of sub-channel 60. Leg portion 76 also curves inwardly to form a lip 82 defining an opening 84 which is smaller in width than the width of sub-channel 62.

As shown in FIG. 2, the housing channel 46 is appropriately dimensioned so that leg portion 70, lower rectangular elongated top plate 74 and leg portion 76 combine to provide a flange which is adapted to fit snugly within the recesses or channels of shiplap board 50. The housing channel 47 is appropriately dimensioned so that leg portion 70, lower rectangular elongated top plate 74, and leg portion 76 fit snugly within the recesses or channels of the T-shaped board 54. The upper elongated top plate 68 of the channels 46 and 47 fit snugly into the notches 40, defined by the lips 38 and the inwardly extending ledges 36.

Returning to FIG. 1, it can be seen that floor assembly 10 is mounted directly on top of frame assembly 20 so that housing channels 46 and 47 extend the length of both sides thereof for receiving flexible conductors such as electrical cables 64, air hoses 66, or the like.

In assembling the parts of the floor, the opposite housings 46 and 47 may first be positioned with their respective top plate portions 68 overlying the flanges 38 and extending into the grooves or notches 40 of the juxtaposed side rails 24. The shiplap boards are then interfitted with the housing 46 and with each other to a position adjacent to but spaced from the housing 47. Finally, the T-shaped board 54 is inserted to provide a key locking all of the boards and the housings 46 and 47 in place. Suitable fasteners may also be provided between the boards and the frame members, if desired.

With floor assembly 10 constructed in the aforementioned manner, it is readily apparent that there is free access to cables 64 and hoses 66 via openings 29 in frame assembly 20, and openings 80 and 84 in channeled housings 46 and 47 in the event the cables and air hoses require maintenance. It is also important to note that the width of the openings 80 and 84 is less than the diameter of the hoses 64 or cables 66 placed in the sub-channels 60 and 62 so that the lips 78 and 82 serve to hold such hoses and cables in a fixed position so as to reduce any possiblity of damage thereto. The hoses or cables may be inserted endwise into the sub-channels. It is further contemplated that the hoses or cables may be made of plastic or rubber or otherwise provided with a resiliently yieldable construction so that they may be forced or snapped through the openings 80 and 84 housing assembly if desired.

While a particular embodiment of the invention has been shown, it should be understood, of course, that the invention is not limited thereto since many modifications may be made. It is, therefore, contemplated to cover the present invention any such modifications as fall within the true spirit and scope of the appended claims.

The invention is claimed as follows:

1. A frame assembly for use in a trailer or other such vehicle which utilizes flexible conductors such as cables or hoses, said frame assembly comprising a first and second opposite side rails and a plurality of transverse frame members extending between said side rails, and a floor assembly mounted on said frame, said floor assembly including a plurality of interfitting floor boards and elongated housing means interfitting with said boards and defining a downwardly facing open channel juxtaposed to either said first or second opposite side rails, said housing including wall means in said channel defining a sub-channel having a restricted opening of predetermined width for snappingly receiving and retaining at least one of said conductors.

2. A floor assembly according to claim 1, wherein said wall means comprises lip means defining said sub-channel opening for retaining a conductor within said sub-channel.

3. A floor assembly according to claim 1, wherein said wall means defines a plurality of said sub-channels for separately receiving and retaining a plurality of said conductors.

4. A floor assembly according to claim 1, wherein said elongated housing means is disposed along one side of said floor assembly, said assembly including a second elongated housing means substantially identical to and the mirror image of said first mentioned elongated housing means and disposed along opposite side of said assembly from said first mentioned side.

5. A floor assembly according to claim 1, which includes a conductor disposed in said sub-channel, said conductor being of resiliently yieldable construction and having a diameter greater than said predetermined width of said opening.

6. In a trailer or other such vehicle, a frame comprising first and second opposite side rails and a plurality of transverse frame members extending between said side rails, and a floor assembly mounted on top of said transverse frame members, said floor assembly comprising first and second opposite side elongated housing means on top of said transverse frame members and respectively juxtaposed to said first and second side rails and a plurality of floor boards therebetween and on top of said transverse frame members, said floor boards including a plurality of shiplap boards interfitting with one of said housing means and disposed in spaced relationship to the other of said housing means and a T-shaped board interfitting with one of said shiplap boards and said other housing means, said housing means being identical and disposed in opposite mirror image relationship, each of said housing means comprising an upper plate portion extending above said frame members and wall means depending from said upper plate portion and defining downwardly opening channel means for receiving conductors such as cables or hoses.

7. In a trailer or other such vehicle according to claim 6, wherein said side rails including inwardly extending flanges above said transverse frame members and inwardly facing groove means merging with said flanges, said upper plate portions respectively extending over said flanges and into said groove means of the side rail respectively juxtaposed thereto.

8. A trailer or other such vehicle according to claim 6 which includes conductors disposed in at least one of said elongated housing means.

9. A trailer or other such vehicle according to claim 6 which includes conductors extending longitudinally in both of said first and second elongated housing means, certain of said conductors comprising electrical wire means and being connected to a light means on said vehicle.

10. In a trailer or other such vehicle, a frame comprising first and second opposite side rails and a plurality of transverse frame members extending between said side rails, and a floor assembly mounted on said frame, said floor assembly comprising first and second opposite side elongated housing means respectively juxtaposed to said first and second side rails and a plurality of floor boards therebetween, said floor boards including a plurality of shiplap boards interfitting with one of said housing means and disposed in spaced relationship to the other of said housing means and a T-shaped interfitting with one of said shiplap boards and said other housing means, said housing means being identical and disposed in opposite mirror image relationship, each of said housing means comprising an upper plate portion extending above said frame members and wall means depending from said upper plate portion and defining downwardly opening channel means for receiving conductors such as cables or hoses, said side rails including inwardly extending flanges above said transverse frame members and inwardly facing groove means merging with said flanges, said upper plate portions respectively extending over said flanges and into said groove means of the side rail respectively juxtaposed thereto.

11. A trailer or other such vehicle according to claim 10 which includes conductors disposed in at least one of said elongated housing means.

12. A trailer or other such vehicle according to claim 10 which includes conductors extending longitudinally in both of said first and second elongated housing means, certain of said conductors comprising electrical wire means and being connected to a light means on said vehicle.

* * * * *